United States Patent
Micewicz

(10) Patent No.: US 9,509,944 B2
(45) Date of Patent: Nov. 29, 2016

(54) SYSTEM AND METHOD FOR FOLLOW ME TELEVISION FUNCTION

(71) Applicant: ADVANCED DIGITAL BROADCAST S.A., Chambesy (CH)

(72) Inventor: Jaroslaw Micewicz, Zielona Gora (PL)

(73) Assignee: ADVANCED DIGITAL BROADCAST S.A., Chambesy (CH)

( * ) Notice: Subject to any disclaimer, the term of this patent is extended or adjusted under 35 U.S.C. 154(b) by 0 days.

(21) Appl. No.: 14/723,473

(22) Filed: May 28, 2015

(65) Prior Publication Data
US 2015/0350590 A1  Dec. 3, 2015

(30) Foreign Application Priority Data
May 28, 2014 (EP) .................................. 14170270

(51) Int. Cl.

| | | |
|---|---|---|
| H04N 5/775 | (2006.01) | |
| H04N 5/44 | (2011.01) | |
| H04N 21/442 | (2011.01) | |
| H04N 21/45 | (2011.01) | |
| H04N 21/422 | (2011.01) | |
| H04N 21/4223 | (2011.01) | |
| H04N 21/436 | (2011.01) | |

(52) U.S. Cl.
CPC ............ *H04N 5/775* (2013.01); *H04N 5/4403* (2013.01); *H04N 21/4223* (2013.01); *H04N 21/42201* (2013.01); *H04N 21/43615* (2013.01); *H04N 21/44218* (2013.01); *H04N 21/44227* (2013.01); *H04N 21/4516* (2013.01); *H04N 21/4524* (2013.01)

(58) Field of Classification Search
None
See application file for complete search history.

(56) References Cited

U.S. PATENT DOCUMENTS

| | | | | |
|---|---|---|---|---|
| 2004/0117788 | A1* | 6/2004 | Karaoguz | H04L 12/2803 717/177 |
| 2007/0207795 | A1* | 9/2007 | Roundtree | G06Q 30/02 455/419 |
| 2012/0272261 | A1* | 10/2012 | Reynolds | H04N 21/222 725/30 |
| 2013/0326041 | A1* | 12/2013 | Bellet | G06F 17/30174 709/223 |

* cited by examiner

*Primary Examiner* — Eileen Adams
(74) *Attorney, Agent, or Firm* — Mark M. Friedman

(57) ABSTRACT

A method for a follow me television function the method comprising the steps of: receiving an audio video content; processing and delivering the content to a first device at a first location for playback; the method further comprising the steps of: monitoring location of at least one another device by a device monitoring means; monitoring location of a user by a user monitoring means; detecting whether the user is closer to a second device than to the first device currently used for playback; wherein in case the user is closer to the second device than to the first device currently used for playback, transferring the audio video playback session from the first device to the second device; and starting playback of the audio video content on the second device and stopping playback on the first device.

7 Claims, 3 Drawing Sheets

SYSTEM AND METHOD FOR FOLLOW ME TELEVISION FUNCTION

Figure 1:
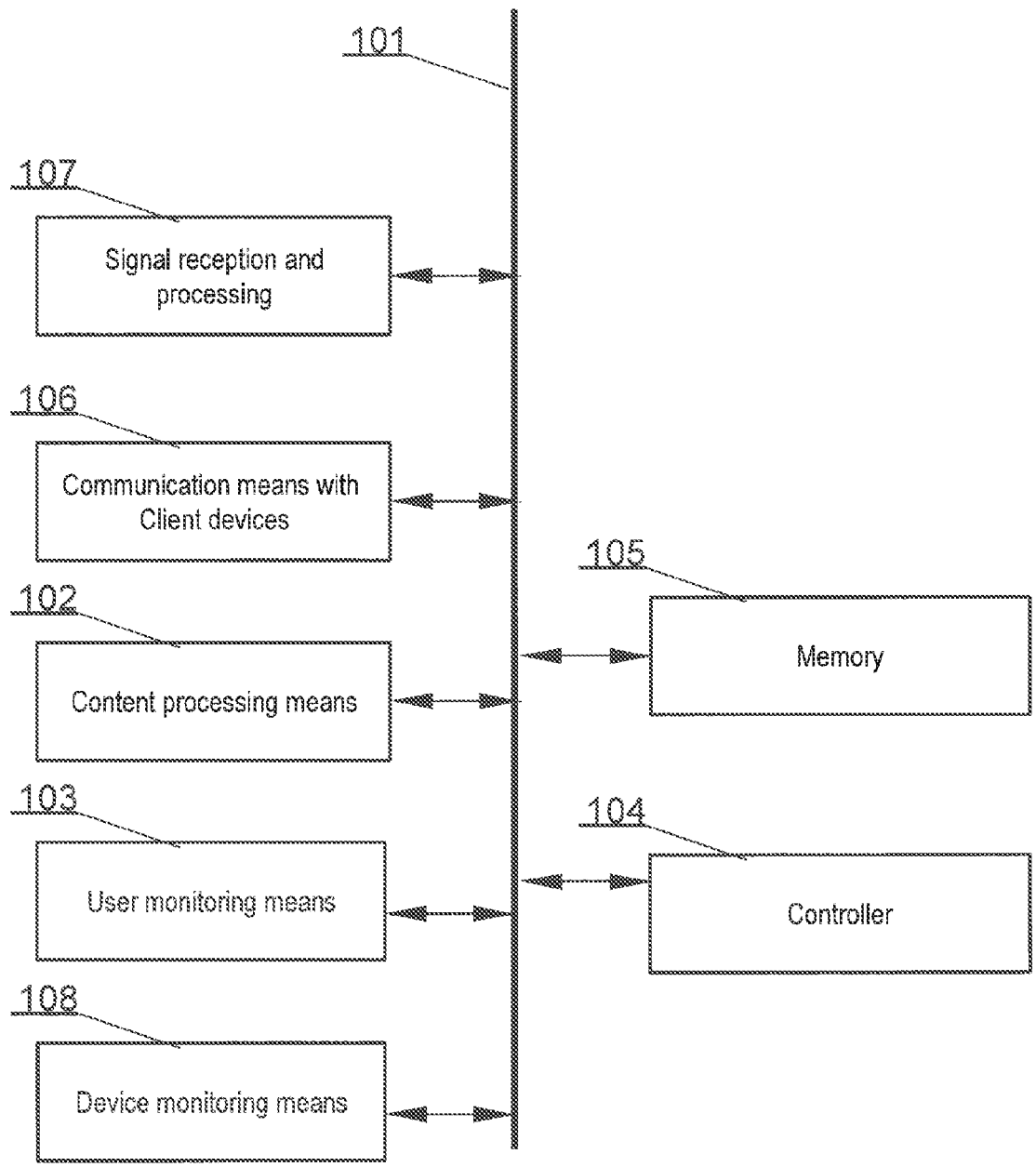

The present invention relates to a system and method for a follow me television function. In particular the present invention relates to proactive automatic viewing session transfer between different devices within a household.

Prior art defines a follow me television that is an improvement of a multi room television. Such a Multi-Room digital video recorder (DVR) offers the ability to send any live of recorded show to any connected display available in a household, including mobile devices.

Such prior art follow me tv system has been disclosed in WO 2006090340 A1 entitled "System and method for providing 'universal follow-me' functionality in a UPnP AV network" discloses a system and method for extending the capabilities of an UPnP AV network architecture with 'Universal Follow-me' functionality to provide users of such networks with a capability to pause or stop the playing of media content at one location in the UPnP AV network and resume the playing of the media content at a later point in time at a different or the same location without loss of continuity.

In such cases the user has to execute special actions and select a device to which playback is to be transferred (based on UPnP protocol) from a list of accessible devices, which is presented on a display screen.

It would be advantageous to design system that would not require pausing the playing of media content at one location and resuming the playing of the media content at a later point in time at a different location without loss of continuity. Preferably such improved system would not require any additional actions from a user.

The aim of the development of the present invention is an improved and cost effective method and system for a follow me television function.

An object of the present invention is a method for a follow me television function the method comprising the steps of: receiving an audio video content; processing and delivering the content to a first device at a first location for playback; the method further comprising the steps of: monitoring location of at least one another device by a device monitoring means; monitoring location of a user by a user monitoring means; detecting whether the user is closer to a second device than to the first device currently used for playback; wherein in case the user is closer to the second device than to the first device currently used for playback, transferring the audio video playback session from the first device to the second device; and starting playback of the audio video content on the second device and stopping playback on the first device.

Preferably, the playback is configured to start on the second device from the moment the audio video content was stopped on the first device.

Preferably, the playback is configured to start, earlier by a predefined amount of time, on the second device from the moment the audio video content was stopped on the first device.

Preferably, the monitoring of location of at least one another device is based on RHID tag or inertial navigation reading or Wifi navigation or LiFi ("light fidelity") navigation or BT (Bluetooth) navigation or NFC readers or GPS navigation or on information provided by a mobile device to the system.

Preferably, the monitoring of location of a user by a user monitoring means is effected by means of infrared sensors or passive acoustic sensors or ultrasonic sensors or photoelectric sensors or cameras or RFID or thermal sensors.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Another object of the present invention is a system for follow me television function, the system comprising: a data bus communicatively coupled to internal modules and configured to communicate the modules among each other; a signal reception and processing module configured to receive a television signal comprising audio video content; a memory communicatively coupled to the data bus; a controller for managing the internal modules; the system further comprising: the controller being configured to execute steps of the method according to the present invention; a content processing means configured to adapt content to particular target client device; communication means with client devices configured to selectively output the audio video content to a given client device; a device monitoring means configured to detect location of at least two devices capable if audio video content playback; and a user monitoring means configured to track at least one user.

Figure 2:
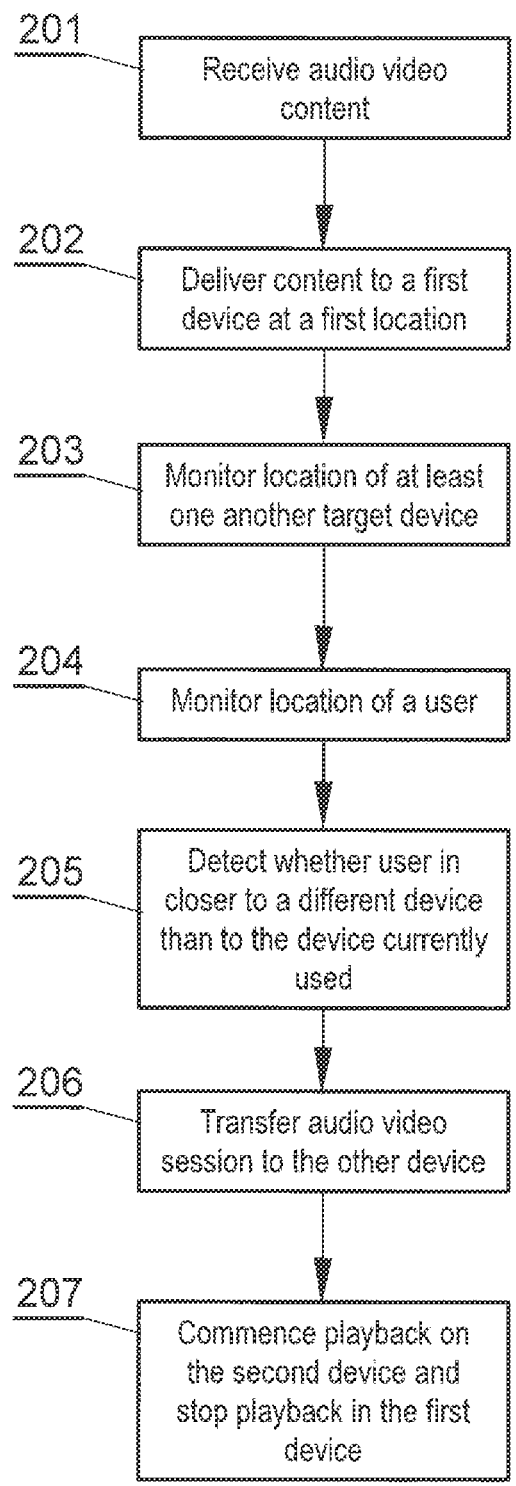
Figure 3:
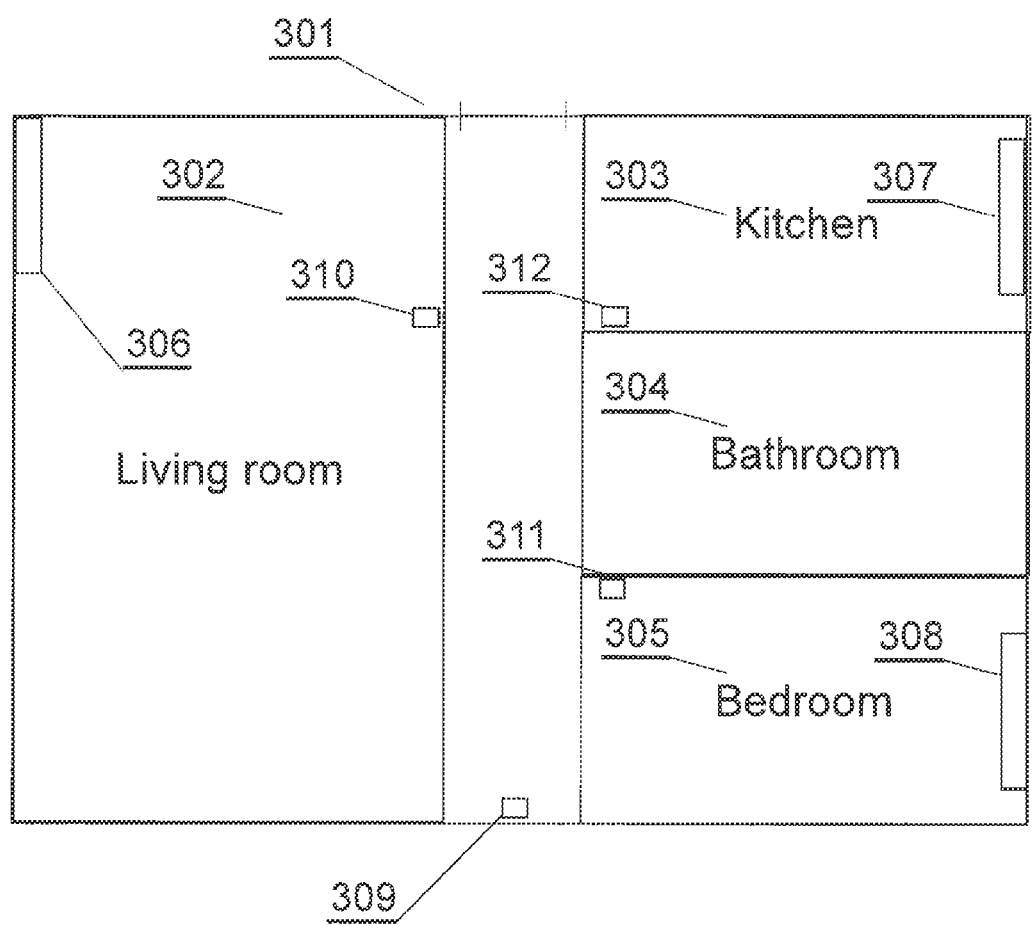

These and other objects of the invention presented herein are accomplished by providing a system and method for a follow me television function. Further details and features of the present invention, its nature and various advantages will become more apparent from the following detailed description of the preferred embodiments shown in a drawing, in which:

FIG. 1 presents a system according to the present invention;

FIG. 2 presents a method according to the present invention;

FIG. 3 presents an exemplary layout of a household.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic or electro-magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

FIG. 1 presents a diagram of the system according to the present invention. The system is a multi room audio video system.

The system may be realized using dedicated components or custom made FPGA or ASIC circuits or CPU system or SoC circuit. The system comprises a data bus 101 communicatively coupled to a memory 104. Additionally, other components of the system are communicatively coupled to the system bus 101 so that they may be managed by a controller 106.

The memory 104 may store computer program or programs executed by the controller 106 in order to execute steps of the method according to the present invention.

The present invention is aimed at automatic audio-video session transfer between devices available in a household. Therefore, the system comprise a signal reception and processing module 107 configured to receive signal for example from satellite, IPTV, cable or terrestrial transmission and to extract audio-video content from the received signal.

After obtaining the audio-video content from the received signal the system may selectively output the content to a given client device via a communication means with client devices 106. Since the present invention applies in a session transfer, there are required at least two client devices which may communicate with a server by means of a wired or wireless communication.

Due to the fact that the client devices may have different content presentation and/or reception capabilities, the system comprises a content processing means 102 configured to adapt content to particular target client device. Such adaptation may include encoding change, resolution change, titrate change, audio conversion or similar adjustments.

In order to be aware of configuration of devices within a household, the system comprises a device monitoring means 108 configured to detect location of devices (audio video playback capability), especially mobile devices and/or to store such information in the memory 104. This information may also be explicitly input by a user. For example, a user may define that device A is a large screen TV set in a living room while a device B is a medium screen TV located in a bedroom whereas a device C is a tablet which is obviously portable.

Detection of location of a portable device may be based on special RFID tags and readers or inertial navigation reading or wifi navigation or LiFi ("light fidelity") like navigation or BT (Bluetooth) navigation or NFC readers or GPS navigation or on information provided by a mobile device to the system or any combination above mentioned techniques. Such information may be based on readings from different sensors such as accelerometer or a gyroscope allowing to detect movement and/or relative position or its change within a household.

Further, in order to be aware where audio video content is to be transferred, the system according to the present invention, comprise a user monitoring means 103. configured to track at least one user within a household. Such user monitoring is similar to user surveillance where mainly user's location with respect to authorized target client devices is of special interest.

In principle the aim is to detect that a user U watching content C on a target device D1 is moving and is in proximity of a target device D2 while moving away from the target device D1. In such case, the system shall transfer session of playback of the content C from the target device D1 to the target device D2.

In another embodiment, when a mobile target device is detected to be moving together with the user, the system shall refrain from transferring the session based on readings from both the user monitoring means 103 and the device monitoring means 108.

In one embodiment there may be set session transfer parental control options, wherein in case of a child, an audio video session will not be allowed to be transferred to any target device within a household but rather to a selected target device(s).

The user monitoring means 103 will typically be a set of sensors that are able to detect user's movement within a household. Such sensors may be infrared sensors, passive acoustic sensors, ultrasonic sensors, photoelectric sensors, cameras, RFID, thermal sensor or similar.

Depending on the used sensor(s), the user monitoring means 103 may differentiate between tracked users and their respective audio video sessions. This may be achieved for example by a wearable RFID or a camera and face recognition algorithms or by identified user specific gait parameters.

In one embodiment, the user monitoring means 103 may also predict future user's location so that content delivery may commence before a user reaches another target device. Such future location prediction may be based on household configuration, history of user's movements or type of user's movement i.e. slow/fast/direct/indirect etc.

FIG. 2 presents a method according to the present invention. The process starts from receiving an audio video content 201 by a multi room server device such as a satellite digital video recorder or a television gateway. After suitably processing the content, it may be delivered 202 to a first device at a first location eg. Living room of a household.

Subsequently, at step 203, there is monitored location of at least one another target device. This is executed by the device monitoring means 108. simultaneously there is executed, at step 204, monitoring location of a user by the user monitoring means 103. After collecting data from steps 203 and 204 there may be executed at step 205, detection whether the user is closer to a different device than to the device currently used for playback.

In case a user has moved and is closer to a different device than to the device currently used for playback, at step 206 there is executed transfer audio video session (playback session on the first device) to the other device. Playback will typically be started from the moment the content was stopped on the first target playback device. Alternatively a user may setup a configuration defining that a portion of content shall be replayed after session transfer eq. 30 s or 60 s. Such option may be available in multi room server capable of audio video content recording.

Lastly, at step 207, there is executed playback of content on the second target device and there is stopped playback by the first target device.

FIG. 3 presents an exemplary layout of a household 301. There are four main rooms (302-305) wherein the living room 302, the kitchen 303 and the bedroom 305 have installed audio video playback devices (306-308). The devices may be stationary or mobile. The central server according to the present invention may be installed inside or outside of the household 301. As already explained, the user monitoring means 103 may cooperate with suitable sensors (310-312) allowing to monitor movement of user(s) within the household 301.

It can be easily recognized, by one skilled in the art, that the aforementioned method for a follow me television function may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory or volatile memory, for example RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for a follow me television function the method comprising the steps of:
   receiving an audio video content (201);
   processing and delivering the content (202) to a first device at a first location for playback for a first user;
   the method being characterized in that it further comprises the steps of:
   monitoring (203) location of at least one another device by a device monitoring means (108):
   monitoring (204) location of the first user by a user monitoring means (103);
   wherein the user monitoring means (103) are configured to differentiate between tracked users and their respective audio video sessions:
   detecting (205) whether the first user is closer to a second device than to the first device currently used for playback;
   wherein in case the first user is closer to the second device than to the first device currently used for playback checking session transfer parental control options, wherein the session transfer parental control options define whether playback, for the first user, may be transferred to the second device;
   in case the playback may be transferred, transferring (206) the audio video playback session from the first device to the second device; and
   starting (207) playback of the audio video content on the second device and stopping playback on the first device.

2. The method according to claim 1 characterized in that the user monitoring means is configured to predict future location of the first user and commence delivery, of the audio video content was stopped on before the first user reaches the second device.

3. The method according to claim 1 characterized in that the playback is configured to start, earlier by a predefined amount of time, on the second device from the moment the audio video content was stopped on the first device.

4. The method according to claim 1 characterized in that the monitoring (203) of location of at least one another device is based on RFID tag or inertial navigation reading or Wifi navigation, or Lifi ("light fidelity") navigation or BT (Bluetooth) navigation or NFC readers or GPS navigation or on information provided by a mobile device to the system.

5. The method according to claim 1 characterized in that the monitoring (204) of location of a user by a user monitoring means (103) is effected by means of infrared sensors or passive acoustic sensors or ultrasonic sensors or photoelectric sensors or cameras or RFID or thermal sensors.

6. A non-transitory computer readable medium storing computer-executable instructions performing all the steps of the computer-implemented method according to claim 1 when executed on a computer.

7. A system for follow me television function, the system comprising:
   a data bus (101) communicatively coupled to internal modules and configured to communicate the modules among, each other;
   a signal reception and processing module (107) configured to receive a television signal comprising audio video content;
   a memory (105) communicatively coupled to the data bus (101);
   a controller (104) for managing the internal modules;
   the system being characterized in that it further comprises:
   the controller (104) being configured to execute steps of the method according to claim 1:
   a content processing means (102) configured to adapt content to particular target client device;
   communication means with client devices (106) configured to selectively output the audio video content to a given client device;
   a device monitoring means (108) configured to detect location of at least two devices capable if audio video content playback; and
   a user monitoring means (103) configured to track at least one user.

* * * * *